Jan. 15, 1952  J. A. PAYSINGER  2,582,602
MAGNETIC FISHING TOOL
Filed June 17, 1949

INVENTOR.
JESSE A. PAYSINGER
BY
Hazard & Miller
ATTORNEYS

Patented Jan. 15, 1952

2,582,602

UNITED STATES PATENT OFFICE 2,582,602

MAGNETIC FISHING TOOL

Jesse A. Paysinger, Cuyama, Calif., assignor of thirty-five per cent to Lennie E. Scurlock, Maricopa, Calif.

Application June 17, 1949, Serial No. 99,613

1 Claim. (Cl. 294—88)

This invention relates to a magnetic fishing tool suitable for retrieving or withdrawing lost steel articles from the bottoms of wells.

In the course of drilling wells many articles become lost in the well, such as for example the cones or roller cutters of rock bits. These should be removed from the well as their presence in the bottom of the well interferes with further drilling operations.

An object of the invention is to provide a magnetic fishing tool consisting essentially of a soft iron core on which a winding is wound adapted to be electrically connected to a source of electric current which is conducted thereto through a cable by which the tool is lowered into the well.

More specifically, an object of the invention is to provide a magnetic fishing tool as above described wherein there is a surrounding shield or bonnet which is telescopically arranged on the core for sliding movement thereon between limits and which is formed of a non-magnetizable material. This shield or bonnet is so designed that its lower end extends downwardly a substantial distance below the bottom of the core when the tool is suspended so that as the tool is withdrawn from the well the fish, which is attracted to the core, will be lifted thereby into the bonnet and held thereby against coming in contact with the casing or well walls which might pull the fish from the core despite the magnetic attraction. The bonnet in its uppermost position has its lower edge approximately even or flush with the bottom of the core so that on engagement with the bottom of the well or with a fish the bottom of the core will be adequately exposed to attract the fish thereto.

With the foregoing and other objects in view which will be made manifest in the following detailed description and specifically pointed out in the appended claim, reference is had to the accompanying drawings for an illustrative embodiment of the invention, wherein:

Figure 1:
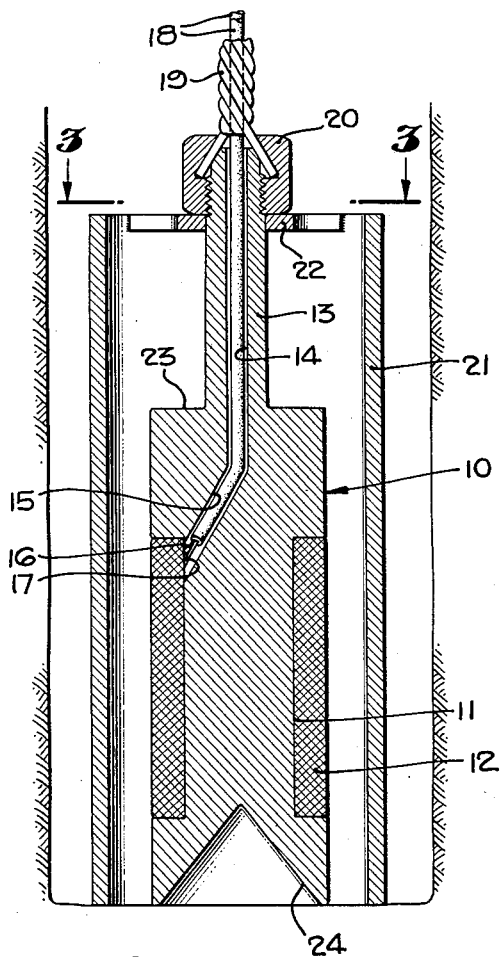
Figure 1 is a vertical section through the bottom of a well illustrating the magnetic fishing tool embodying the present invention in position therein.
Figure 2:
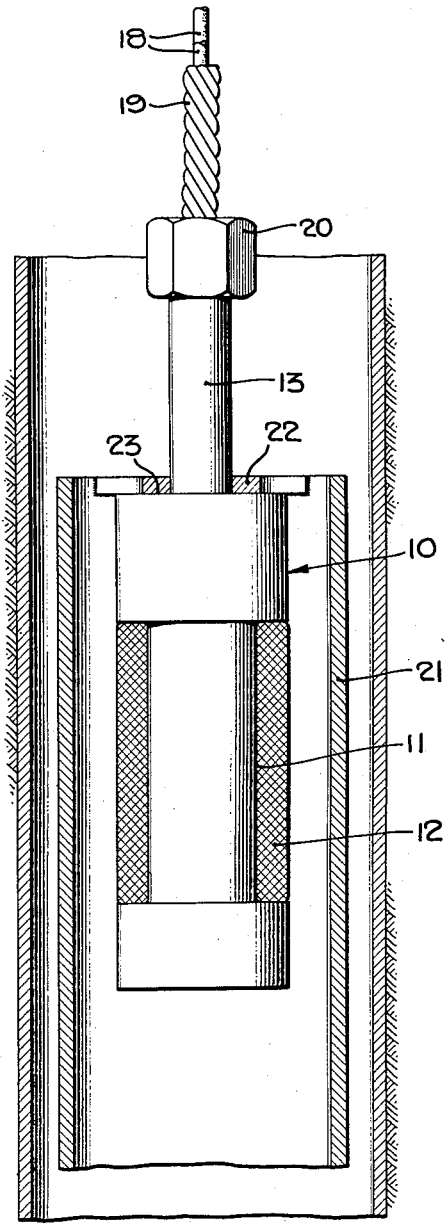
Fig. 2 is a view similar to Fig. 1, but illustrating the tool in that position wherein it is being withdrawn from the well.
Figure 3:
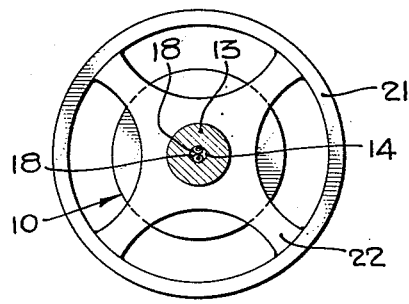
Fig. 3 is a horizontal section taken substantially upon the line 3—3 upon Fig. 1.

Referring to the accompanying drawings wherein similar reference characters designate similar parts throughout, the improved fishing tool comprises a soft iron core, generally indicated at 10, on the exterior of which there is cut or otherwise formed a relatively wide groove 11 within which is wound an insulated winding 12 adapted when energized by electric current to convert the core 10 into an electromagnet. The top of the core has a reduced stem 13 centrally of which there is a vertical bore 14 which communicates at its lower end with an inclined bore 15. The bores 14 and 15 are designed to receive leads 16 and 17 which lead to the winding 12. These leads are, in turn, connected to a central pair of conductors 18 which are within a lowering cable 19 that is connected to the core 10 by means of a wire rope socket or the equivalent indicated at 20. Surrounding the core there is a cylindrical shield or bonnet 21 preferably formed of bronze or other equivalent non-magnetizable material. At the top of this bonnet there is a spider 22 which is slidable on the stem 13 between the rope socket 20 and the shoulder 23. In its uppermost position the bottom edge of the bonnet is approximately even with the bottom of the core 10 whereas, as illustrated in Fig. 2, when the bonnet is in its lowermost position it extends downwardly some distance below the bottom of the core. In the preferred form of construction the bottom of the core is preferably internally coned as indicated at 24.

The operation of the magnetic fishing tool is substantially as follows:

Assuming that a steel article has become lost in the well the tool is attached to a lowering cable indicated at 19 and lowered into the well. On or before reaching the bottom of the well a source of electric current preferably direct current but not necessarily so, is supplied to the conductors 18 which will energize the winding 12, thus highly magnetizing the core 10. When the bottom of the well is encountered or a fish is encountered the bonnet 21 will be held against descent while the core 10 may be allowed to lower therethrough to engage the fish and magnetically attract it. The coned bottom at 24 will permit of small articles to enter the core to some extent. On then lifting the cable 19 the core will be drawn upwardly into the bonnet or into the position shown in Fig. 2, in which condition it can be withdrawn from the well. The bonnet in thus descending over the fish that is magnetically attracted to the core 10 will, in effect, be protected thereby so that even if the tool should engage the well walls or the walls of the casing in the course of its ascent, the fish will be held out of contact therewith by the bonnet and consequently, will not be scraped off or pulled off of the core. As the bonnet is formed of a non-magnetizable material it will not be magnetized or attract itself to the steel walls of the casing.

From the above-described construction it will be appreciated that a relatively simple, novel, and highly advantageous fishing tool is provided which can be very advantageously employed to extract small steel articles from the bottom of wells.

Various changes may be made in the details of construction without departing from the spirit and scope of the invention as defined by the appended claim.

I claim:

A magnetic fishing tool comprising a core having an external groove thereon, a winding disposed in the groove, bores in the core, leads in the bores connected to the winding, the core having a reduced stem adjacent the upper end thereof, means at the top of the stem for attaching the core to a cable containing conductors, a bonnet, having a spider slidable on the stem, adapted to assume an uppermost position wherein its bottom edge is substantially even with the bottom of the core and a lowermost position wherein the bottom edge of the bonnet extends downwardly below the bottom of the core, the bottom of the core being internally coned.

JESSE A. PAYSINGER.

REFERENCES CITED

The following references are of record in the file of this patent:

UNITED STATES PATENTS

| Number | Name | Date |
|---|---|---|
| 517,806 | Maish | Apr. 3, 1894 |
| 974,047 | Frederickson | Oct. 25, 1910 |
| 1,439,686 | Brandon | Dec. 26, 1922 |
| 1,439,687 | Brandon | Dec. 26, 1922 |
| 2,092,316 | Lane | Sept. 7, 1937 |
| 2,491,860 | Ingraham | Dec. 20, 1949 |